(No Model.)

N. LEHNEN.
PROCESS OF AND APPARATUS FOR REDUCING ORES BY AMALGAMATION.

No. 535,064. Patented Mar. 5, 1895.

Witnesses:
O. G. Bradbury.
W. C. Swift.

Inventor:
Nicholas Lehnen.
per: F. D. Merwin
Attorney.

UNITED STATES PATENT OFFICE.

NICHOLAS LEHNEN, OF ST. PAUL, MINNESOTA, ASSIGNOR OF TWO-THIRDS TO JACOB MANNHEIMER AND WM. A. JONES, OF SAME PLACE.

PROCESS OF AND APPARATUS FOR REDUCING ORES BY AMALGAMATION.

SPECIFICATION forming part of Letters Patent No. 535,064, dated March 5, 1895.

Application filed March 20, 1894. Serial No. 504,420. (No model.)

*To all whom it may concern:*

Be it known that I, NICHOLAS LEHNEN, of St. Paul, Ramsey county, Minnesota, have invented certain Improvements in Processes of and Apparatus for Reducing Ores by Amalgamation, of which the following is a specification.

My invention relates to improvements in the process of and apparatus for, the separation of precious metals from their ores, its object being to provide a reducing agent, such as will separate precious metals which are coated or so finely divided as not to be collectible freely upon a metallic plate coated with mercury alone.

In the reduction of ores by amalgamation, they are first pulverized by machinery and afterward brought into contact with mercury, either on a metallic plate or in a vessel, whereupon the mercury retains the metals by amalgamation.

My improvement consists in the use of a combination of mercury and metallic cyanide, instead of mercury alone, for the purpose of amalgamating or separating the precious metals from their ores. By this means a class of ores not freely reduced by ordinary amalgamation, such as ores in which the metals are very finely divided or associated with, or coated with, metallic sulphide, can be reduced. So far as known in all previous commercial uses of the metallic cyanides, in connection with their chemical combination with metals an aqueous solution of the cyanide has been used, having the definite object of creating a soluble combination of cyanide and metal. In my improved process, instead of creating a soluble salt of the metals, I create a peculiar surface upon which the metals are caught while passing over it, forming a combination with the material of said surface like or similar to an amalgam.

Figure 1:
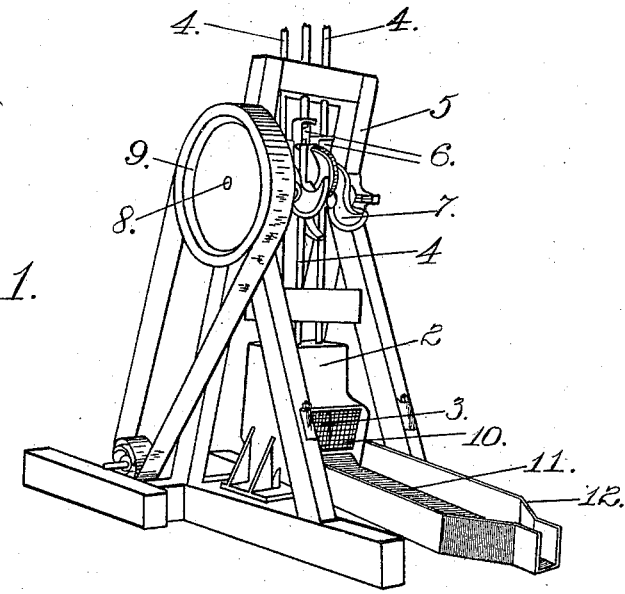
Figure 2:
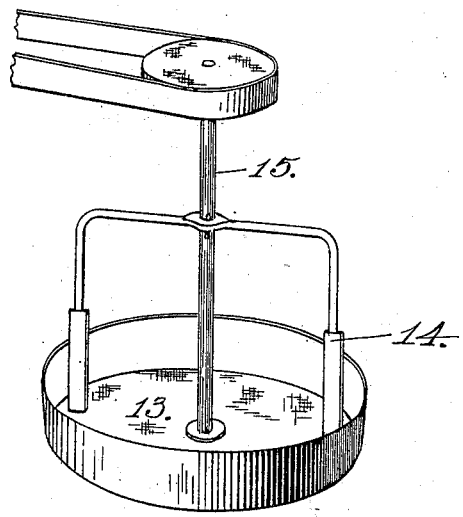

In the accompanying drawings, Figure 1 is an elevation of a common form of ore separator, in which the metals are separated on an amalgamated metallic plate, and Fig. 2 is a perspective view of a mixing tub.

The process of reduction is substantially as follows: The ore having been broken into small lumps in an ordinary rock crusher, is fed into the mortar 2 into which a small stream of water is also discharged. The ore is here pulverized by the dropping of the stamps 3 upon it. The stamps are supported upon the lower ends of the rods 4 guided in the horizontal portions of the frame 5. Upon the upper ends of the rods 4 are secured the collars 6, which are elevated and dropped by the cams 7, guided upon and revolving with the shaft 8, driven by the pulley 9. On one side of the mortar at the bottom, is the screen covered opening 10, through which the ore passes as fast as it becomes reduced fine enough to pass through the meshes. It falls upon the bottom 11 of the graduated sloping trough 12, through which it is slowly carried by the small stream of water flowing through the mortar. The bottom of this trough is a metallic plate treated with, first, a solution of metallic cyanide; second, metallic mercury, and, third, with a solution of metallic cyanide, and the particles of metal, which have been separated from the ore gangue by the pulverizing thereof, amalgamate or combine with the material of the prepared surface, as they come in contact with it. The amalgam or combination thus formed is afterward scraped off, and the mercury and cyanide are driven off therefrom by heat, and the remaining porous mass is melted and poured into molds, thus forming the ordinary bars of commerce.

I claim—

1. The herein described improved process of reducing ores, consisting of passing the crushed ore over a metallic plate coated with mercury and metallic cyanide.

2. In an ore separator, the combination with the receptacle for the crushed ore, of the removable metallic plate forming the bottom thereof and prepared with mercury and metallic cyanide.

3. As an improved article of manufacture, a plate having coatings of mercury and metallic cyanide.

4. The herein described process of reducing ores, consisting of first pulverizing the same, and then passing them over a metallic plate prepared by treating its surface first, with a solution of metallic cyanide, second with mercury, and third, with a solution of metallic cyanide.

5. A metallic plate for separating metals from their ores, prepared by treating its surface with first, a solution of metallic cyanide, second, mercury, and third, a solution of metallic cyanide.

6. As an improved article of manufacture, an amalgam plate, coated with a series of alternate layers of metallic cyanide and mercury.

In testimony whereof I affix my signature in presence of two witnesses.

NICHOLAS LEHNEN.

Witnesses:
 W. C. SWIFT,
 T. D. MERWIN.